United States Patent [19]

Kim

[11] Patent Number: 5,546,207
[45] Date of Patent: Aug. 13, 1996

[54] LIQUID CRYSTAL DISPLAY DEVICE AND METHOD FOR FABRICATING THE SAME

[75] Inventor: Man S. Kim, Seoul, Rep. of Korea

[73] Assignee: Goldstar Co., Ltd., Seoul, Rep. of Korea

[21] Appl. No.: 361,140

[22] Filed: Dec. 21, 1994

[30] Foreign Application Priority Data

Dec. 22, 1993 [KR] Rep. of Korea ................ 29110/1993

[51] Int. Cl.$^6$ ................ G02F 1/136; G02F 1/13
[52] U.S. Cl. ................ 359/74; 359/59; 359/87
[58] Field of Search ................ 359/59, 74, 87

[56] References Cited

U.S. PATENT DOCUMENTS

| | | | |
|---|---|---|---|
| 5,062,690 | 11/1991 | Whetton | 359/59 |
| 5,121,236 | 6/1992 | Ukai et al. | 359/59 |
| 5,289,016 | 2/1994 | Noguchi | 359/59 |

*Primary Examiner*—William L. Sikes
*Assistant Examiner*—Ron Trice
*Attorney, Agent, or Firm*—John P. White

[57] ABSTRACT

Disclosed is a method for fabricating a liquid crystal display device with a repair structure, comprising a substrate; a plurality of thin film transistors arranged in matrix, each of the thin film transistors including a gate electrode, a gate insulating layer, a semiconductor layer, an ohmic layer and a source/drain electrode which are formed on the substrate; a plurality of pixel electrodes arranged alternatively with respect to the thin film transistors; a plurality of gate bus lines extended between the pixel electrodes arranged in two adjacent rows and commonly connected with gates of the thin film transistors arranged in the same row; a plurality of data bus lines extended between the pixel electrodes arranged in two adjacent columns and commonly connected with the source electrodes of the thin film transistors arranged in the same column; and a passivation layer thereon. The fabricating method comprises the steps of depositing the passivation layer having an opening pattern wider than the pixel electrode to expose entire surface of the pixel electrode and expose a portion of the gate insulating layer between the pixel electrode and the passivation layer; and re-etching a short portion between the pixel electrode and the bus line using the passivation layer as a mask to repair the short portion. Thus, the liquid crystal display device is improved in reliability and a yield of its production can be improved.

1 Claim, 3 Drawing Sheets

5,546,207

1

LIQUID CRYSTAL DISPLAY DEVICE AND METHOD FOR FABRICATING THE SAME

BACKGROUND OF THE INVENTION

1. Field of the Invention

The present invention relates a liquid crystal display device with a plurality of thin film transistors (hereinafter, referred to as "TFT-LCD device"), and more particularly to a TFT-LCD capable of repairing a point defect such as an electrical short between a pixel electrode and a data bus line of a thin film transistor (hereinafter, referred to as "TFT") during fabrication thereof, and a method for fabricating the same.

2. Description of the Prior Art

Generally, a defect in a TFT-LCD is broadly classified into two defects, one of which is a point defect occurring due to inferiority of a TFT, a pixel electrode, a pixel and the like, and the other of which is a line defect occurring due to an electrical open or short of a bus line or non-conduction of a driving IC (integrated circuit). As main defects occurring frequently in a TFT-LCD, there are an electrical short at a crossover between gate and data bus lines, an electrical short between gate and source electrodes of a TFT, and an electrical open of each of gate and data bus lines.

As a TFT-LCD becomes larger in scale thereof and higher in integration, it is necessary to solve occurrence of the above-described defects in fabrication of the TFT-LCD. Thus, a TFT-LCD with a redundancy structure or a repair structure has been developed.

FIG. 1A is a plane view of a prior art TFT-LCD with a repair structure and FIG. 1B is a cross-sectional view taken along the line A—A' of FIG. 1A.

Referring to FIG. 1A, a prior art TFT-LCD comprises a substrate 30, a plurality of pixel electrodes 34 and TFTs 31 arranged on the substrate 30 in matrix of row and column, a plurality of gate and data bus lines 33, 34, and a passivation layer 35 formed on the substrate 30 other than the pixel electrodes 34. In this TFT-LCD, the pixel electrode 34 and the TFT 31 are alternatively arranged with each other.

Also, the gate bus line 32 is extended between the pixel electrodes 32 arranged in an odd row and the other pixel electrodes arranged in an even row, and commonly connected with gates of the TFTs 31 arranged in the same row of the plurality of TFTs. The data bus line 33 also is formed in zigzag form between the pixel electrodes arranged in the odd column and the other pixel electrodes arranged in the even column and is commonly connected to source electrodes of the TFTs 31 arranged in the same column.

With reference to FIG. 1B, each of the TFTs 31 has a gate electrode 31-1 formed on a glass substrate 30, a gate insulating layer 31-2 formed over the substrate including the gate electrode 31-1, a semiconductor layer 31-3 formed above the gate electrode 31-1 with the gate insulating layer 31-2 interposed therebetween and composed of amorphous silicon, a pixel electrode 34 formed on the gate insulating layer 31-2 other than the gate electrode 31-1, an amorphous silicon ohmic layer 31-4 formed on the semiconductor layer 31-3; a source electrode 31-5 formed on the gate insulating layer 31-2 including one side of the ohmic layer 31-4, a drain electrode 31-6 formed on the gate insulating layer 31-2 including the other side of the ohmic layer 31-4, and a passivation layer 35 formed over entire surface other than the pixel electrode 34.

Hereinafter, a method for fabricating the TFT-LCD of FIG. 1B will be described in detail.

2

On a glass substrate 30, a metal layer is formed by sputtering, and then patterned to form a gate electrode 31-1 and a gate bus line 32. Also, on the substrate 30 including the gate electrode 31-1, a gate insulating layer 31-2, a first amorphous silicon layer, and a second amorphous silicon layer doped with an impurity are sequentially deposited.

Next, the amorphous layers 14 is selectively etched back to form an ohmic layer 31-2 and a semiconductor layer 31-3 corresponding to the gate electrode 31-1, and then a portion of the ohmic layer 31-4 on the semiconductor layer 31-3 is etched.

Subsequently, an ITO film is formed thereon and patterned to form a pixel electrode 34. After deposition of a metal over the substrate, a photo-etching is performed, thereby allowing source and drain electrodes 31-5, 31-6 to be formed.

Finally, a passivation layer 35 is deposited thereon, and therefore the fabrication sequence of the TFT-LCD is completed.

In the TFT-LCD fabricated thus, when a signal voltage is applied to the source and drain electrodes, a channel is formed in the semiconductor layer 31-3, so that a signal voltage applied from the data bus line to the source electrode is supplied to the pixel electrode, thereby allowing the pixel corresponding to each TFT to be driven.

However, in fabrication of the above-described TFT-LCD, a metal film deposited to form a source/drain electrode and a data bus line is completely eliminated during patterning. Because occurrence of particles of the metal film, a point defect occurs between a data bus line and a pixel electrode. For occurrence of this point defect, there arises the problem that a TFT can not serve as a switching device of a liquid crystal display device.

In addition, in case that an electrical short caused by a point defect occurs in the prior art TFT-LCD device having the above-described structure, such a point defect can not be repaired therein. As a result, such a TFT-LCD device is lowered in reliability and a yield of its production is reduced.

SUMMARY OF THE INVENTION

It is an object of the present invention to provide a liquid crystal display device, in which a point defect, such as an electrical short between a data bus line and a pixel electrode or the like, can be repaired.

It is another object of the present invention to provide a method for fabricating a liquid crystal display device, in which a point defect thereof can be repaired while fabricating it.

According to the aspect of the present invention, the liquid crystal display device comprising a substrate; a plurality of thin film transistors arranged in matrix, each of the thin film transistors including a gate electrode, a gate insulating layer, a semiconductor layer, an ohmic layer and a source/drain electrode which are formed on the substrate; a plurality of pixel electrodes arranged alternatively with respect to the thin film transistors; a plurality of gate bus lines extended between the pixel electrodes arranged in two adjacent rows and commonly connected with gates of the thin film transistors arranged in the same row; a plurality of data bus lines extended between the pixel electrodes arranged in two adjacent columns and commonly connected with the source electrodes of the thin film transistors arranged in the same column; and a passivation layer having an opening pattern wider than the pixel electrode to expose entire surface of the pixel electrode and expose a portion of the gate insulating layer between the pixel electrode and the passivation layer.

According to another aspect of the present invention, the method for fabricating a liquid crystal display device which comprises a substrate; a plurality of thin film transistors arranged in matrix, each of the thin film transistors including a gate electrode, a gate insulating layer, a semiconductor layer, an ohmic layer and a source/drain electrode which are formed on the substrate; a plurality of pixel electrodes arranged alternatively with respect to the thin film transistors; a plurality of gate bus lines extended between the pixel electrodes arranged in two adjacent rows and commonly connected with gates of the thin film transistors arranged in the same row; a plurality of data bus lines extended between the pixel electrodes arranged in two adjacent columns and commonly connected with the source electrodes of the thin film transistors arranged in the same column; and a passivation layer thereon, the method comprising the steps of forming the gate bus lines and the gate electrodes on the glass substrate; sequentially depositing the gate insulating layer, an amorphous silicon layer and an impurity-doped amorphous silicon layer on the substrate including the gate electrode and the gate bus line; sequentially etching back the amorphous silicon layers to form the ohmic layer and the semiconductor layer on the gate insulating layer corresponding to the gate electrode; removing a portion of the ohmic layer to expose a surface portion of the semiconductor layer; coating an ITO film thereon and patterning it to form the pixel electrodes on the gate insulating layer at an outside of the gate electrode; depositing the passivation layer having an opening pattern wider than the pixel electrode to expose entire surface of the pixel electrode and expose a portion of the gate insulating layer between the pixel electrode and the passivation layer; and re-etching a short portion between the pixel electrode and the bus line using the passivation layer as a mask to repair the short portion.

BRIEF DESCRIPTION OF THE DRAWINGS

This invention may be better understood and its object will become apparent to those skilled in the art by reference to the accompanying drawings as follows.

DESCRIPTION OF THE PREFERRED EMBODIMENT(S)

Figure 1A:
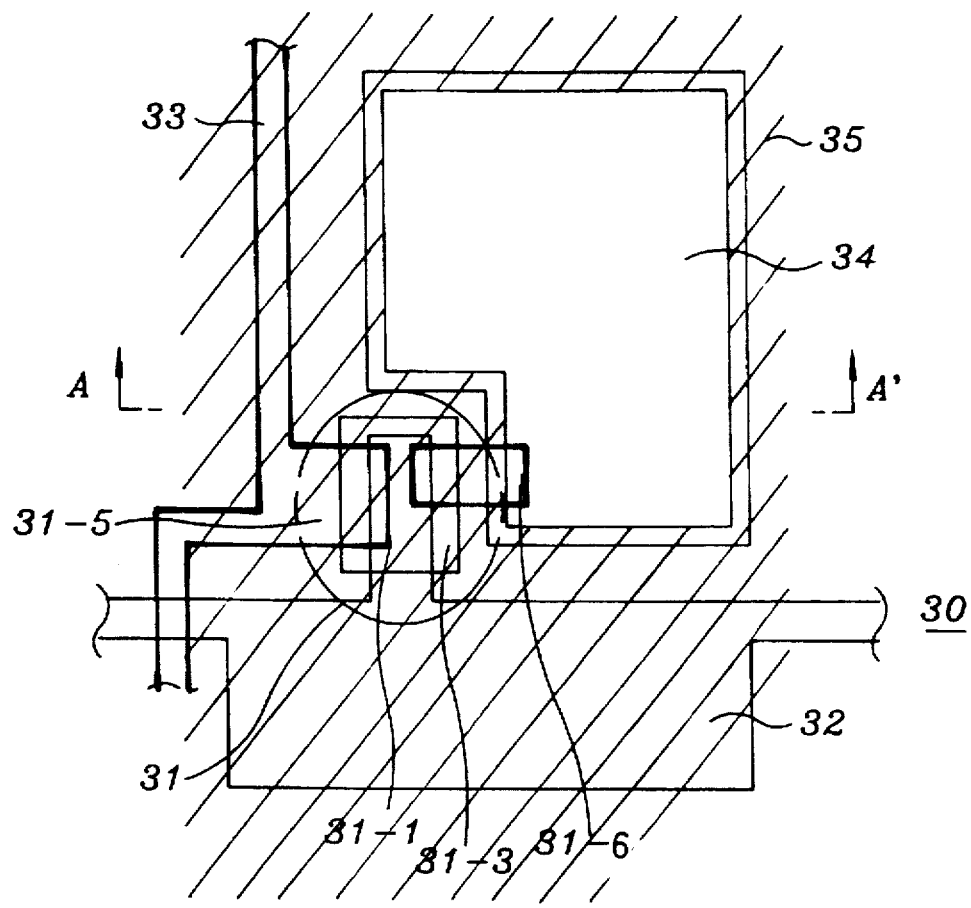
FIG. 1A is a plane view of a prior art TFT-LCD with a repair structure.
Figure 1B:
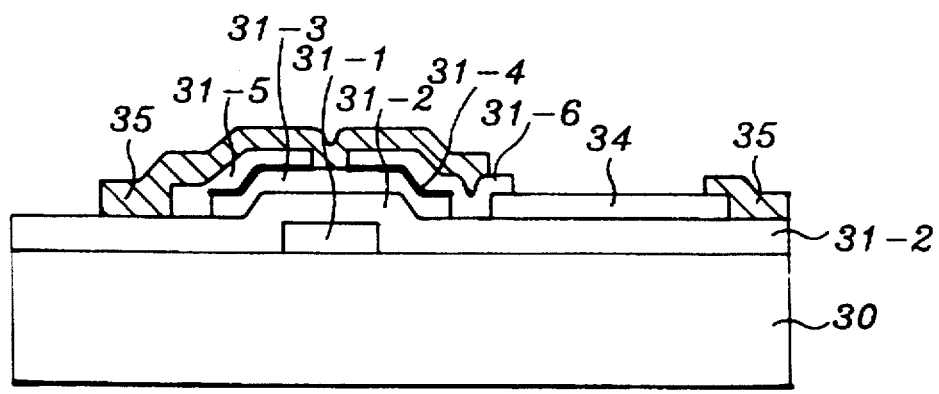
FIG. 1B is a cross-sectional view taken along the line A—A' of FIG. 1A.
Figure 2A:
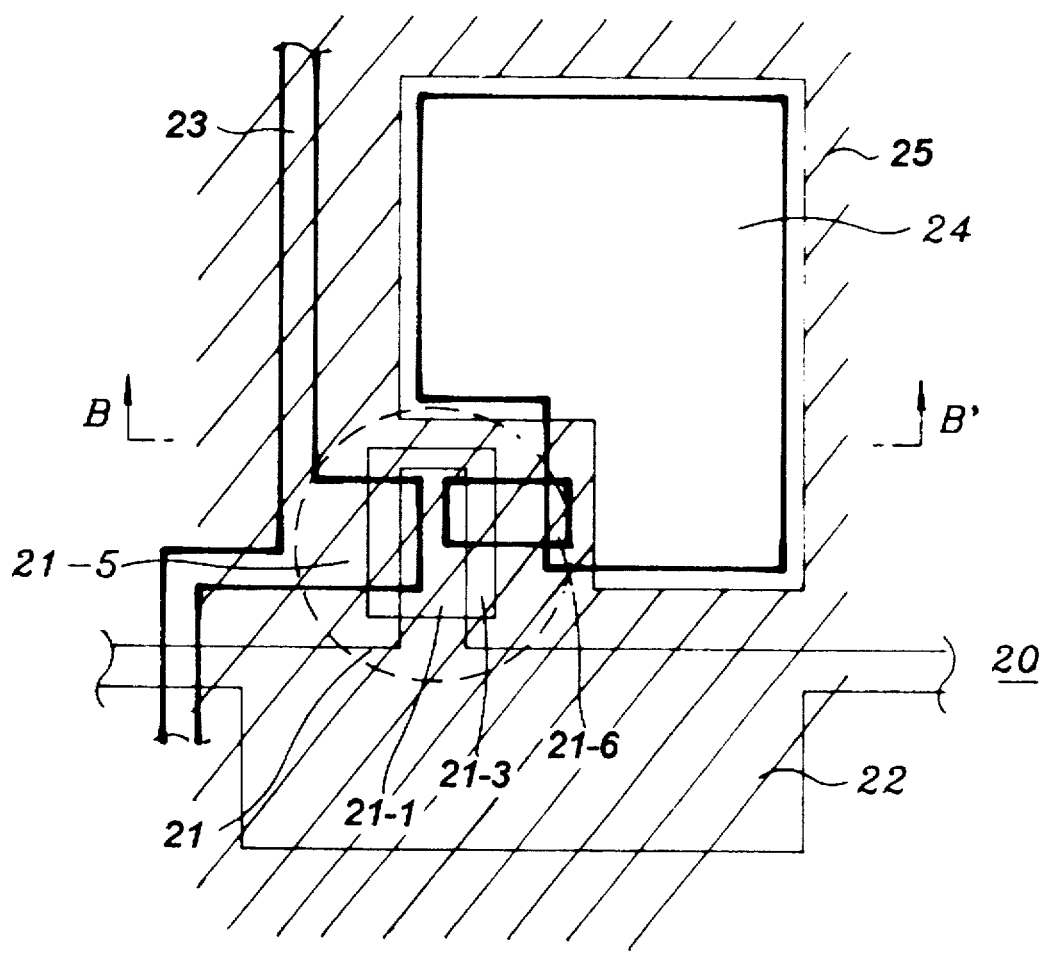
FIG. 2A is a plane view showing the construction of a liquid crystal display device which is manufactured by the fabricating method of the present invention.
Figure 2B:
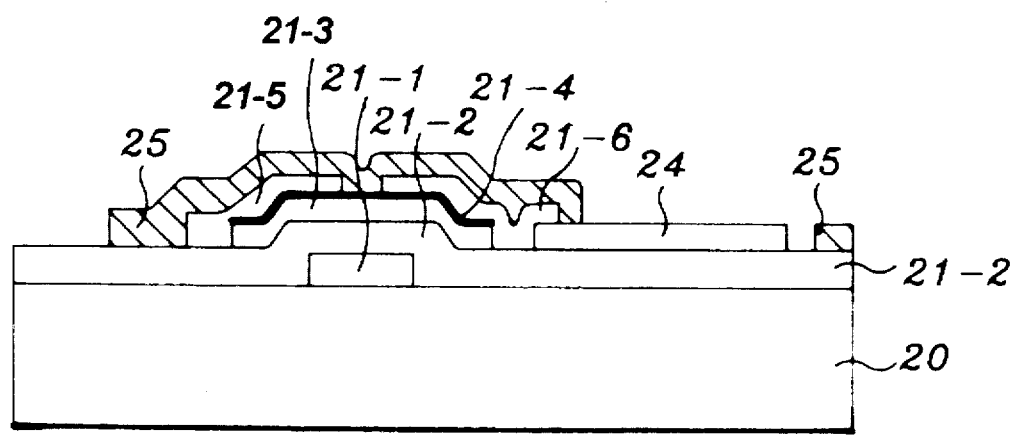
FIG. 2B is a cross-sectional view taken along the line B—B' of FIG. 2A.

FIGS. 2A and 2B show the construction of the TFT-LCD device of the present invention. The TFT-LCD device of FIG. 2B is the same structure as that of the prior art TFT-LCD device of FIG. 1B except that an opening is formed between a pixel electrode and a passivation layer.

Referring to FIGS. 2A and 2B, the TFT-LCD device of the present invention comprises a substrate 20, a plurality of pixel electrodes 24 and TFTs 21 arranged on the substrate 20 in matrix of row and column, a plurality of gate and data bus lines 22, 23, and a passivation layer 25 formed on the substrate 20 other than the pixel electrode 24. In this TFT-LCD device, the pixel electrode 24 and the TFT 21 are alternatively arranged with each other. Also, the gate bus line 22 is extended between the pixel electrodes arranged in the odd row and the other electrodes arranged in the even row, and is commonly connected to gates of the TFTs 21 arranged in the same row of the plurality of TFTs. The data bus line 23 is formed in zigzag form between the pixel electrodes arranged in the odd column and the other pixel electrodes arranged in the even column, and is commonly connected to source electrodes of the TFTs 21 arranged in the same column.

With reference to FIG. 2B, each of the TFTs 21 has a gate electrode 21-1 formed on a glass substrate 21-1, a gate insulating layer 21-2 formed over the substrate including the gate electrode 21-1, a semiconductor layer 21-3 formed above the gate electrode 21-1 with the gate insulating layer 21-2 interposed therebetween and composed of amorphous silicon, a pixel electrode 24 formed on the gate insulating layer 21-2 other than the gate electrode 21-1, an impurity-doped amorphous silicon ohmic layer 31-4 formed on the semiconductor layer 21-3; a source electrode 21-5 formed on the gate insulating layer 21-2 including one side of the ohmic layer 21-4, a drain electrode 21-6 formed on the gate insulating layer 21-2 including the other side of the ohmic layer 21-4, and a passivation layer 25 formed over entire surface other than the pixel electrode 24.

Particularly, as shown in FIG. 2A, the TFT-LCD device of the present invention has an opening between the pixel electrode 24 and the passivation layer 25. For example, a pattern of the passivation layer 25 is formed wider than that of the pixel electrode to form an opening between them and expose a portion of the gate insulating layer 21-2, as shown in FIG. 2B.

In the construction of the TFT-LCD device, if an electrical short is generated between the data bus line 22 and the pixel electrode 24, a portion where the electrical short is generated is etched again by using an opening pattern of the relatively wide passivation layer 25 to the pixel electrode 24 as an etching mask, allowing the portion to be repaired during fabricating the TFT-LCD device.

Hereinafter, a method for fabricating the TFT-LCD will be described in detail with reference to FIGS. 2A and 2B.

Referring to FIG. 2B, on a glass substrate 20, a metal is deposited by sputtering and patterned to form a gate electrode 21-1 and a gate bus line 22.

Next, on the substrate 20 including the gate electrode 21-1, a gate insulating layer 21-2, an amorphous silicon layer, and an impurity-doped amorphous silicon layer are sequentially formed, and then patterned by a well-known etching process. Then, the amorphous silicon layers deposited thus are sequentially removed to form semiconductor and ohmic layers 21-3, 21-4 above the gate electrode 21-1, respectively. A portion of the ohmic layer 21-4 formed above the gate electrode 21-1 is removed to expose a surface portion of the semiconductor layer 21-3.

Subsequently, an ITO (indium tin oxide) film is deposited over the substrate, and then patterned to form a pixel electrode 24 on the gate insulating layer 21-2 at the outside of the gate electrode 21-1.

In addition, a metal thin film is formed thereon and patterned to form source and drain electrodes 21-5, 21-6 and a data bus line 23.

Finally, a passivation layer 25 is deposited on the substrate 20 other than the pixel electrode 24, thereby obtaining a TFT-LCD device. In this TFT-LCD device, since an opening pattern of the passivation layer 25 is wider than the pixel electrode 24, overall surface of the pixel electrode 24 is entirely exposed.

The TFT-LCD device fabricated thus has a repair structure and the repairing operation thereof will be described below with reference to FIGS. 3A and 3B.

Figure 3A:
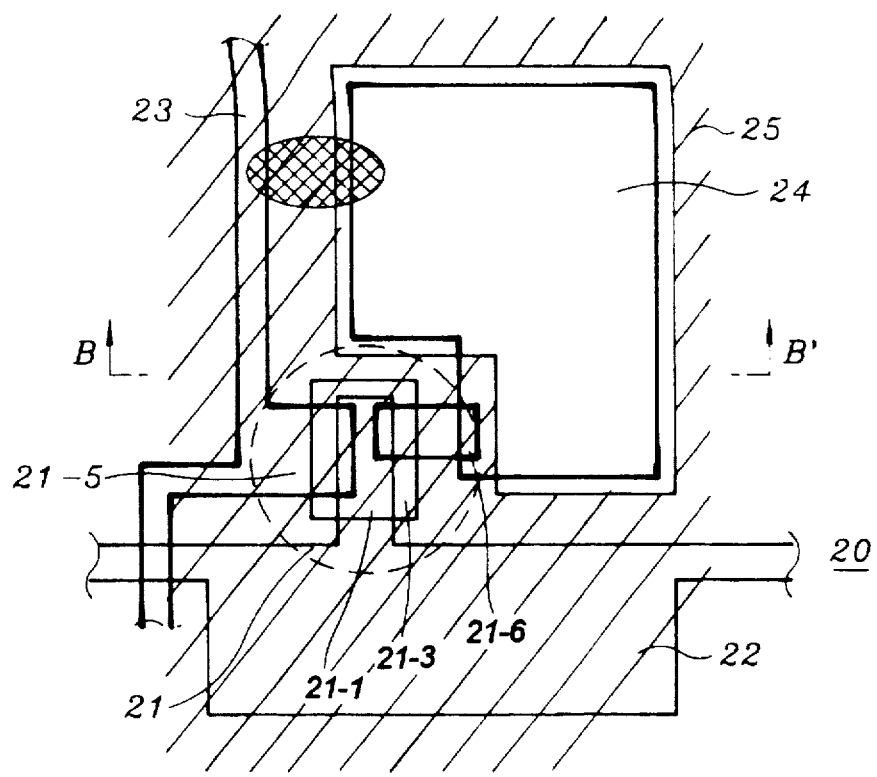
FIGS. 3A and 3B are plane views to explain that a point defect is repaired in the liquid crystal display device manufactured by the fabricating method of the present invention.
Figure 3B:
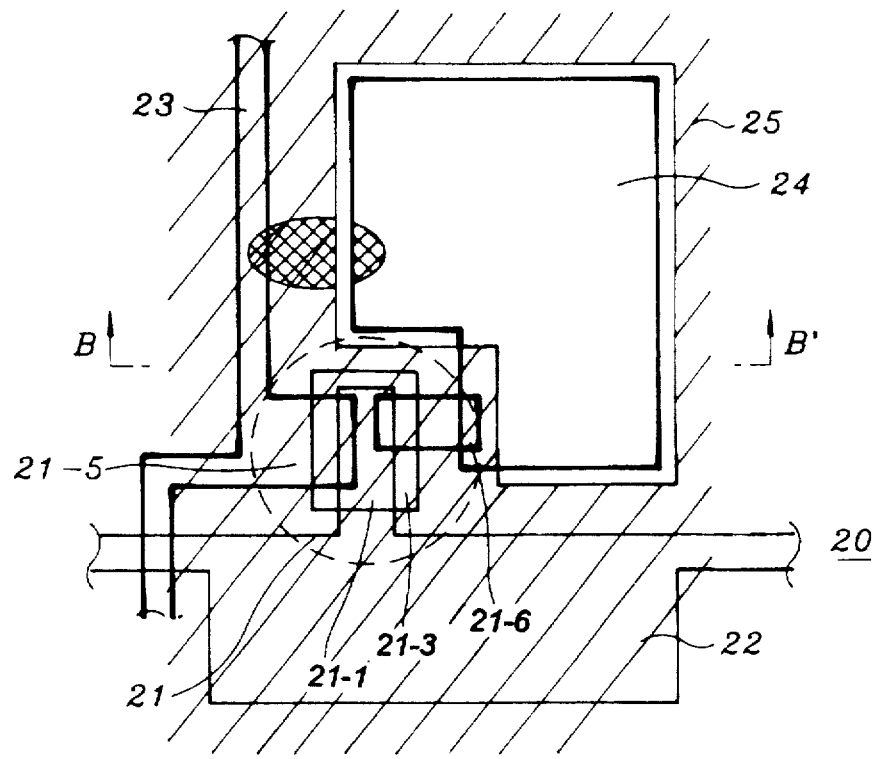

In the TFT-LCD device fabricated thus, if a short is generated between the data bus line 23 and the pixel electrode 24 and/or between the pixel electrode 24 and the gate bus line 22, as shown by an oblique line of FIG. 3A, a portion where the short is generated is re-etched using the passivation layer 25 as a mask, thereby allowing the short portion to be repaired.

Since an opening pattern of the passivation layer 25 is wider than the pixel electrode 24, entire surface of the pixel electrode 24 is exposed. Accordingly, even if a short is generated between the pixel electrode and the data bus line, a short portion between the passivation layer and the pixel electrode is etched again as shown in FIG. 3B, thereby allowing it to be removed.

As described above, according to the present invention, an electrical short between a bus line and a pixel electrode can be repaired by re-etching during fabricating. Therefore, TFT-LCD of the present invention may be improved in reliability, and according to the fabricating method of the present invention a yield of its production can be improved.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A method for fabricating a liquid crystal display device which comprises a substrate; a plurality of thin film transistors arranged in matrix, each of the thin film transistors including a gate electrode, a gate insulating layer, a semiconductor layer, an ohmic layer and a source/drain electrode which are formed on the substrate; a plurality of pixel electrodes arranged alternatively with respect to the thin film transistors; a plurality of gate bus lines extended between the pixel electrodes arranged in two adjacent rows and commonly connected with gates of the thin film transistors arranged in the same row; a plurality of data bus lines extended between the pixel electrodes arranged in two adjacent columns and commonly connected with the source electrodes of the thin film transistors arranged in the same column; and a passivation layer thereon, the method comprising the steps of:

forming the gate bus lines and the gate electrodes on the substrate;

sequentially depositing an insulating layer which forms each gate insulating layer, an amorphous silicon layer and an impurity-doped amorphous silicon layer on the substrate including the gate electrodes and the gate bus lines;

sequentially etching back the amorphous silicon layers to form each ohmic layer and each semiconductor layer on the insulating layer corresponding to each gate electrode;

removing a portion of each ohmic layer to expose a surface portion of each semiconductor layer;

coating an ITO film thereon and patterning it to form the pixel electrodes on each gate insulating layer at an outside of each gate electrode;

depositing the passivation layer having an opening pattern wider than each pixel electrode to expose an entire surface of each pixel electrode and expose a portion of each gate insulating layer between each pixel electrode and the passivation layer; and re-etching a short portion between a pixel electrode and a bus line using the passivation layer as a mask to repair the short portion.

* * * * *